United States Patent
Krishnamurthy et al.

(10) Patent No.: US 10,977,872 B2
(45) Date of Patent: Apr. 13, 2021

(54) GRAPHICAL STYLE MODIFICATION FOR VIDEO GAMES USING MACHINE LEARNING

(71) Applicant: Sony Interactive Entertainment Inc., Tokyo (JP)

(72) Inventors: Sudha Krishnamurthy, Foster City, CA (US); Ashish Singh, Amherst, MA (US); Naveen Kumar, San Mateo, CA (US); Justice Adams, San Mateo, CA (US); Arindam Jati, Los Angeles, CA (US); Masanori Omote, Half Moon Bay, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/177,241

(22) Filed: Oct. 31, 2018

(65) Prior Publication Data
US 2020/0134929 A1    Apr. 30, 2020

(51) Int. Cl.
| G06T 19/00 | (2011.01) |
| G06T 19/20 | (2011.01) |
| G06N 3/04 | (2006.01) |
| A63F 13/60 | (2014.01) |

(52) U.S. Cl.
CPC .............. *G06T 19/20* (2013.01); *A63F 13/60* (2014.09); *G06N 3/0454* (2013.01); *G06T 2219/2012* (2013.01)

(58) Field of Classification Search
None
See application file for complete search history.

(56) References Cited

U.S. PATENT DOCUMENTS

| 5,704,013 A | 12/1997 | Watari et al. |
| 5,764,853 A | 6/1998 | Watari et al. |
| 5,796,921 A | 8/1998 | Minamino et al. |
| 5,903,867 A | 5/1999 | Watari et al. |
| 5,956,684 A | 9/1999 | Ishii et al. |
| 6,064,323 A | 5/2000 | Ishii et al. |
| 6,067,521 A | 5/2000 | Ishii et al. |
| 6,161,093 A | 12/2000 | Watari et al. |
| 6,185,527 B1 | 2/2001 | Petkovic et al. |
| 6,253,174 B1 | 6/2001 | Ishii et al. |
| 6,266,442 B1 | 7/2001 | Laumeyer et al. |
| 6,725,155 B1 | 4/2004 | Takahashi et al. |
| 6,879,956 B1 | 4/2005 | Honda et al. |
| 6,980,956 B1 | 12/2005 | Takagi et al. |

(Continued)

OTHER PUBLICATIONS

U.S. Appl. No. 16/177,214, filed Oct. 31, 2018, Sudha Krishnamurthy.

(Continued)

*Primary Examiner* — Martin Mushambo
(74) *Attorney, Agent, or Firm* — JDI Patent; Joshua Isenberg; Robert Pullman

(57) ABSTRACT

Graphical style modification may be implemented using machine learning. A color accommodation module receives an image frame from a host system and generates a color-adapted version of the image frame. A Graphical Style Modification module receives a first image frame from a host system and applies a style adapted from a second image frame to the first image frame to generate a style adapted first image frame.

13 Claims, 9 Drawing Sheets

(56) References Cited

U.S. PATENT DOCUMENTS

| | | | |
|---|---|---|---|
| 7,158,934 | B2 | 1/2007 | Honda et al. |
| 7,228,276 | B2 | 6/2007 | Omote et al. |
| 7,236,922 | B2 | 6/2007 | Honda et al. |
| 7,729,689 | B2 | 6/2010 | Chakraborty et al. |
| 7,885,727 | B2 | 2/2011 | Omote |
| 8,743,125 | B2 | 6/2014 | Omote |
| 8,788,256 | B2 | 7/2014 | Chen et al. |
| 8,803,939 | B2* | 8/2014 | Xue ............ H04N 7/147 348/14.01 |
| 8,886,576 | B1 | 11/2014 | Sanketi et al. |
| 8,947,491 | B2* | 2/2015 | Rosenberg ...... H04N 7/141 348/14.03 |
| 9,253,440 | B2* | 2/2016 | Setton ............ H04N 7/147 |
| 9,307,195 | B2* | 4/2016 | Carlsson ........ H04N 7/147 |
| 9,916,538 | B2 | 3/2018 | Zadeh et al. |
| 10,049,477 | B1* | 8/2018 | Kokemohr ........ G06T 11/60 |
| 10,109,092 | B1 | 10/2018 | Hitchings, Jr. |
| 10,112,113 | B2 | 10/2018 | Krishnamurthy et al. |
| 2001/0023397 | A1 | 9/2001 | Tajima et al. |
| 2001/0043594 | A1 | 11/2001 | Ogawa et al. |
| 2002/0010916 | A1 | 1/2002 | Thong et al. |
| 2004/0030552 | A1 | 2/2004 | Omote et al. |
| 2004/0085327 | A1* | 5/2004 | Jones ............ G09B 29/02 345/591 |
| 2005/0080514 | A1 | 4/2005 | Omote et al. |
| 2005/0102135 | A1 | 5/2005 | Goronzy et al. |
| 2005/0149318 | A1 | 7/2005 | Honda et al. |
| 2005/0149319 | A1 | 7/2005 | Honda et al. |
| 2006/0195598 | A1 | 8/2006 | Fujita et al. |
| 2006/0247825 | A1 | 11/2006 | Omote |
| 2007/0011012 | A1 | 1/2007 | Yurick et al. |
| 2008/0014966 | A1 | 1/2008 | Chakraborty et al. |
| 2008/0030517 | A1* | 2/2008 | Chuang ............ G09G 5/06 345/589 |
| 2009/0079754 | A1* | 3/2009 | Chen ............ G09G 3/20 345/589 |
| 2009/0231347 | A1 | 9/2009 | Omote |
| 2009/0244256 | A1* | 10/2009 | Wheatley ........ H04N 5/23203 348/14.08 |
| 2010/0211376 | A1 | 8/2010 | Chen et al. |
| 2011/0173235 | A1 | 7/2011 | Aman et al. |
| 2012/0201452 | A1* | 8/2012 | Pettigrew .......... H04N 1/62 382/165 |
| 2012/0206560 | A1* | 8/2012 | Setton ............ H04N 7/147 348/14.08 |
| 2014/0104295 | A1* | 4/2014 | Sorkine-Hornung ........ G06T 11/60 345/589 |
| 2014/0114643 | A1 | 4/2014 | Baker et al. |
| 2014/0184727 | A1* | 7/2014 | Xiao .......... H04N 5/23238 348/14.07 |
| 2014/0233847 | A1* | 8/2014 | Ratcliff .......... G06K 9/00228 382/154 |
| 2014/0356848 | A1 | 12/2014 | Peterson |
| 2015/0104066 | A1* | 4/2015 | Shellshear ........ G06K 9/00778 382/103 |
| 2016/0140435 | A1 | 5/2016 | Bengio et al. |
| 2017/0061250 | A1 | 3/2017 | Gao et al. |
| 2017/0132768 | A1* | 5/2017 | Bedi .............. H04L 67/36 |
| 2017/0132821 | A1 | 5/2017 | Valliani et al. |
| 2017/0282063 | A1 | 10/2017 | Krishnamurthy |
| 2018/0035163 | A1 | 2/2018 | Thomas et al. |
| 2018/0047395 | A1 | 2/2018 | Sommers et al. |
| 2018/0095534 | A1 | 4/2018 | Omote |
| 2018/0204111 | A1 | 7/2018 | Zadeh et al. |
| 2019/0102908 | A1 | 4/2019 | Yang et al. |
| 2019/0114487 | A1 | 4/2019 | Vijayanarasimhan et al. |
| 2019/0197187 | A1 | 6/2019 | Zhang et al. |
| 2019/0197315 | A1 | 6/2019 | Zhang et al. |
| 2019/0251987 | A1 | 8/2019 | Oord et al. |
| 2020/0134298 | A1 | 4/2020 | Zavesky et al. |

OTHER PUBLICATIONS

U.S. Appl. No. 16/177,221, filed Oct. 31, 2018, Ashish Singh.
U.S. Appl. No. 16/177,232, filed Oct. 31, 2018, Naveen Kumar.
Hochreiter & Schmidhuber. "Long Short-term memory." Neural Computation 9(8):1735-1780 (1997).
Non-Final Office Action for U.S. Appl. No. 16/177,221, dated Jul. 31, 2019.
Trivedi, Chintan "Turning Fortnite into PUBG with Deep Learning (CycleGAN)" Towards Data Science, available at: https://towardsdatascience.com/turning-fortnite-into-pubg-with-deep-learning-cyclegan-2f9d339dcdb0 (Jun. 18, 2018).
Zhu et al. "Unpaired Image to Image Translation using Cycle-Consistent Adversarial Networks" ArXiv, 10 ArXiv:1703.10593v5 [cs.CV] available at: https://arxiv.org/pdf/1703.10593.pdf.
International Search Report & Written Opinion dated Nov. 26, 2019 for International Patent Application No. PCT/US2019/053762.
International Search Report and Written Opinion dated Dec. 13, 2019 for International Patent Application No. PCT/US02019/053748.
International Search Report and Written Opinion dated Dec. 19, 2019 for International Patent Application No. PCT/US2019/053744.
Non-Final Office Action for U.S. Appl. No. 16/177,232, dated Oct. 7, 2019.
R. Shetty, "Natural Language Description of Images and Videos" m Aalto University, School of Science, Master's Thesis. [online], Sep. 8, 2016. [Retrieved on Nov. 11, 2019] Retrieved from the Internet ; entire document, especially p. 77, para 3.
Non-Final Office Action for U.S. Appl. No. 16/177,197, dated Jun. 10, 2020.
Final Office Action for U.S. Appl. No. 16/177,221, dated Jan. 31, 2020.
Final Office Action for U.S. Appl. No. 16/177,232, dated Apr. 20, 2020.
Final Office Action for U.S. Appl. No. 16/177,232, dated Jan. 29, 2020.
International Search Report and Written Opinion dated Jan. 13, 2020 for International Patent Application No. PCT/US19/53741.
Non-Final Office Action for U.S. Appl. No. 16/177,232, dated Jun. 1, 2020.
Non-Final/Final Office Action for U.S. Appl. No. 16/177,221, dated May 8, 2020.
Notice of Allowance for U.S. Appl. No. 16/177,221, dated Aug. 13, 2020.
Final Office Action for U.S. Appl. No. 16/177,197, dated Nov. 12, 2020.
Final Office Action for U.S. Appl. No. 16/177,232, dated Dec. 30, 2021.
Non-Final/Final Office Action for U.S. Appl. No. 16/177,197, dated Mar. 2, 2021.

* cited by examiner

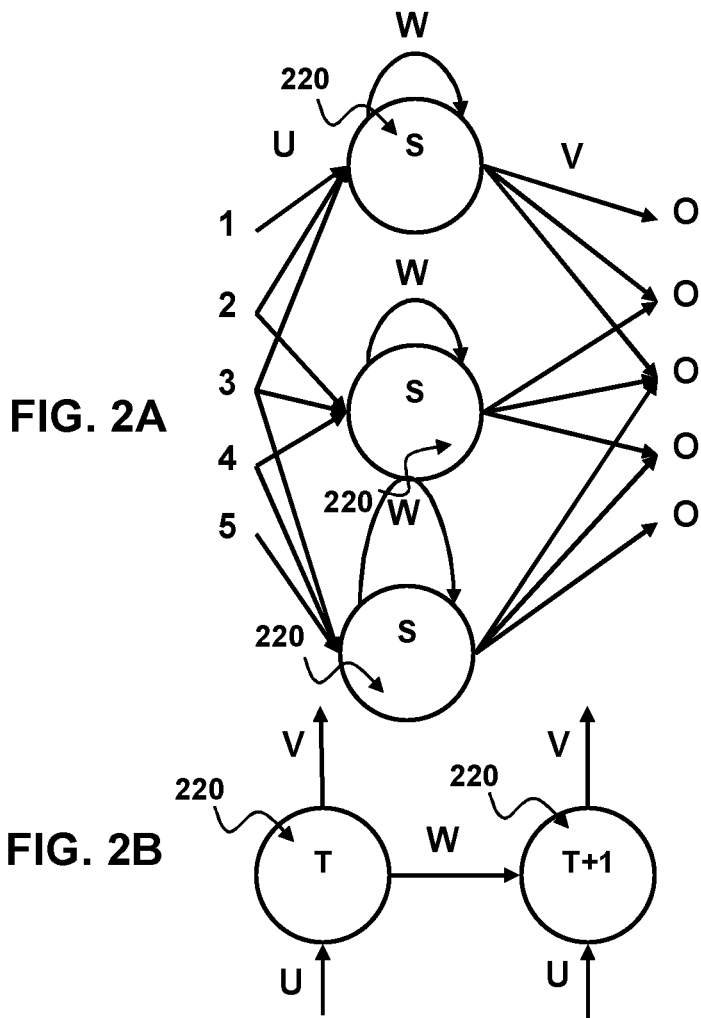
FIG. 2A
FIG. 2B
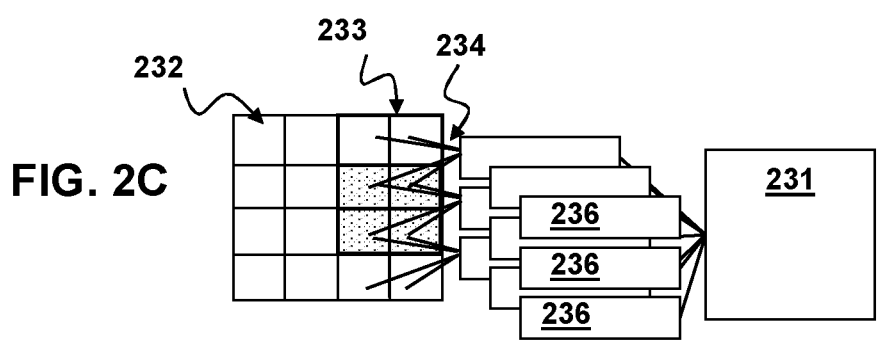
FIG. 2C

GRAPHICAL STYLE MODIFICATION FOR VIDEO GAMES USING MACHINE LEARNING

FIELD OF THE DISCLOSURE

The present disclosure relates to the field of audio-visual media enhancement specifically the addition of content to existing audio-visual media to improve accessibility for impaired persons.

BACKGROUND OF THE INVENTION

Not all audio-visual media, e.g., videogames, are accessible to disabled persons. While it is increasingly common for videogames to have captioned voice acting for the hearing impaired, other impairments such as vision impairments receive no accommodation. Additionally older movies and games did not include captioning.

The combined interactive Audio Visual nature of videogames means that simply going through scenes and describing them is impossible. Many videogames today include open world components where the user has a multitude of options meaning that no two-action sequences in the game are identical. Additionally customizing color pallets for the colorblind is impossible for many video games and movies due to the sheer number of scenes and colors within each scene. Finally there already exist many videogames and movies that do not have accommodations for disabled people, adding such accommodations is time consuming and labor intensive.

It is within this context that embodiments of the present invention arise.

BRIEF DESCRIPTION OF THE DRAWINGS

The teachings of the present invention can be readily understood by considering the following detailed description in conjunction with the accompanying drawings, in which:

FIG. 2A is a simplified node diagram of a recurrent neural network for use in an On-Demand Accessibility System according to aspects of the present disclosure.

FIG. 2B is a simplified node diagram of an unfolded recurrent neural network for use in an On-Demand Accessibility System according to aspects of the present disclosure.

FIG. 2C is a simplified diagram of a convolutional neural network for use in an On-Demand Accessibility System according to aspects of the present disclosure.

DESCRIPTION OF THE SPECIFIC EMBODIMENTS

Figure 1:
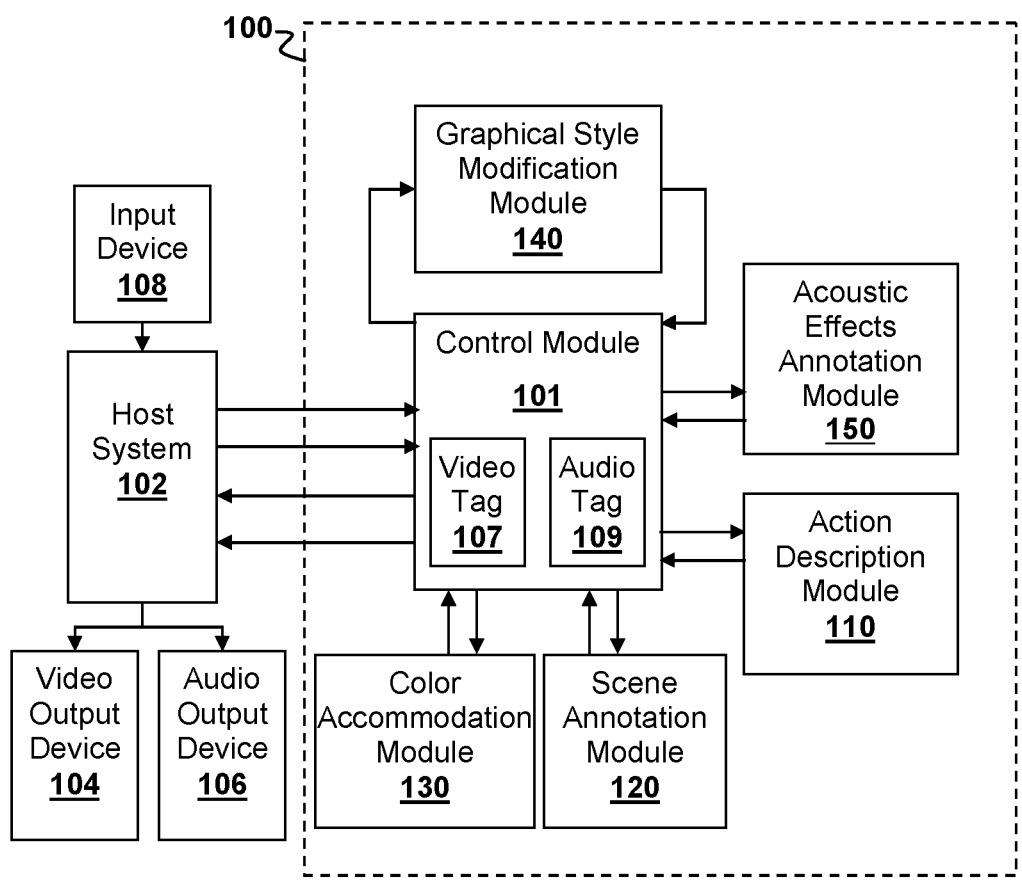
FIG. 1 is a schematic diagram of an On-Demand Accessibility System according to aspects of the present disclosure.

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claimed invention.

While numerous specific details are set forth in order to provide a thorough understanding of embodiments of the invention, those skilled in the art will understand that other embodiments may be practiced without these specific details. In other instances, well-known methods, procedures, components and circuits have not been described in detail so as not to obscure aspects of the present disclosure. Some portions of the description herein are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm, as used herein, is a self-consistent sequence of actions or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated or otherwise as apparent from the following discussion, it is to be appreciated that throughout the description, discussions utilizing terms such as "processing", "computing", "converting", "reconciling", "determining" or "identifying," refer to the actions and processes of a computer platform which is an electronic computing device that includes a processor which manipulates and transforms data represented as physical (e.g., electronic) quantities within the processor's registers and accessible platform memories into other data similarly represented as physical quantities within the computer platform memories, processor registers, or display screen.

A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, flash memories, or any other type of non-transitory media suitable for storing electronic instructions.

The terms "coupled" and "connected," along with their derivatives, may be used herein to describe structural relationships between components of the apparatus for performing the operations herein. It should be understood that these terms are not intended as synonyms for each other. Rather, in some particular instances, "connected" may indicate that two or more elements are in direct physical or electrical contact with each other. In some other instances, "connected", "connection", and their derivatives are used to indicate a logical relationship, e.g., between node layers in a neural network. "Coupled" may be used to indicated that two or more elements are in either direct or indirect (with other intervening elements between them) physical or electrical contact with each other, and/or that the two or more elements co-operate or communicate with each other (e.g., as in a cause an effect relationship).

On Demand Accessibility System

According to aspects of the present disclosure, an On Demand Accessibility system provides enhancements for existing media to improve the accessibility to disabled users. Additionally, the On Demand Accessibility system may provide aesthetic benefits and an improved experience for non-disabled users. Further, the On-Demand Accessibility System improves the function of media systems because it creates Accessibility content for disabled persons without the need to alter existing media. Media in this case may be video games, movies, television, or music. The On Demand Accessibility system applies subtitles, text to speech description, color changes and style changes to aid in accessibility of videogames and other media to those with disabilities.

In one potential implementation illustrated schematically in FIG. 1, an On Demand Accessibility System 100 includes different component modules. These modules may include an Action Description module 110, a Scene Annotation module 120, a Color Accommodation module 130, a Graphical Style Modification module 140 and an Acoustic Effect Annotation module 150. Each of these component modules provides a separate functionality to enhance the accessibility of media content to the user. These modules may be implemented in hardware, software, or a combination of hardware and software. Aspects of the present disclosure include implementations in which the On Demand Accessibility System incorporates only one of the above-mentioned component modules. Aspects of the present disclosure also include implementations in which the On Demand Accessibility System incorporates combinations of two or more but less than all five of the above-mentioned five component modules.

The accessibility system 100 may receive as input audio and video from live game play, implemented by a host system 102. The input audio and video may be streamed, e.g., via Twitch to an internet livestream where it is processed online. The on-demand architecture of the accessibility system 100 gives a control to the player so that by a simple command, e.g., the push of a button the player can selectively activate one or more the different component modules 110, 120, 130, 140 and 150.

As shown in FIG. 1 certain elements that implement the five component modules are linked by a control module 101. The control module 101 receives input image frame data and audio data from the host system 102. The control module 101 directs appropriate data from the host system to each module so that the module can carry out its particular process. The control module 101 thus acts as a "manager" for the component modules 110, 120, 130, 140, providing each of these modules with appropriate input data and instructing the modules work on the data. The control module 101 may receive output data from the component modules and use that data to generate corresponding image or audio data that output devices can use to produce corresponding modified images and audio signals that are presented to the user by a video output device 104 and an audio output device 106. By way of example, and not by way of limitation, the control module 101 may use the output data to generate output image frame data containing closed captioning and style/color transformations or audio data that includes text to speech (TTS) descriptions of corresponding images. The controller 101 may also synchronize audio and/or video generated by the component modules with audio and/or video provided by the host system 102, e.g., using time stamps generated by the component modules. For example, the controller 101 may use a time stamp associated with data for TTS generated by the Action Description module 120 or Scene Annotation module 130 to synchronize play of TTS audio over corresponding video frames. Furthermore, the controller 101 may use a time stamp associated with data for captions generated by the Acoustic Effect Annotation module 150 to synchronize display of text captions over video frames associated with corresponding audio.

Communication of audio and video data among controller 101, the host system 102 and component modules 110, 120, 130, 140, 150 can be a significant challenge. For example, video and audio data may be split from each other before being sent it to the controller 101. The controller 101 may divide audio and video data streams in to units of suitable size for buffers in the controller and component modules and then sending these data units to the appropriate component module. The controller 101 may then wait for the component module to respond with appropriately modified data, which it can then send directly to the host system 102 or process further before sending it to the host system.

To facilitate communication between the controller 101 and the component modules 110, 120, 130, 140 and 150 the system 100 may be configured so that it only uses data when needed and so that predictive neural networks in the component modules do not make predictions on a continuous basis. To this end, the controller 101 and the component modules 110, 120, 130, 140 and 150 may utilize relatively small buffers that contain no more data than needed for the component modules to make a prediction. For example, if the slowest neural network in the component modules can make a prediction every second only a 1-second buffer would be needed. The control module 101 contains the information on how long the buffers should be and uses these buffers to store information to send data to the component modules. In some implementations, one or more of the component modules may have buffers embedded into them. By way of example and not by way of limitation, the action description module 110 may have a buffer embedded into it for video. In more desirable implementations, all continuous memory management/buffers reside in the controller module 101. The system 100 may be configured so that audio and/or video data from the host system 102 is consumed only when needed and is discarded otherwise. This avoids problems associated with the prediction neural networks being on all the time, such as computations from becoming too complex, the host system 102 being overloaded, and issues with synchronization due to different processing times for the audio and the video.

By way of example, and not by way of limitation, to ensure that the audio and visual components are properly synchronized the control module may operate on relatively short windows of audio or video data from the host system 102, e.g., intervals of about 1 second or less. In some implementations, the control module may have sufficient buffers or memory to contain 1 second of audio and video from the host system as well as each of the component modules. The control module may also comprise a text to speech module and/or a closed caption module to add text or speech to the inputs.

The control module 101 is in charge of merging the separate neural network models together in a cohesive way that ensures a smooth experience for the user. The control module 101 sets up the audio and video streams, divides them up into the buffers mentioned above, and listens for user input (e.g., from a game input device 108). Once it receives input, the control module 101 reacts accordingly by sending data to the corresponding component module (depending on the nature of the received user input). The control module then receives the results back from the corresponding component module and alters the game's visuals/audio accordingly.

By way of example, and not by way of limitation, the controller 101 may implement a multi-threaded process that uses a streaming service, such as Streamlink, and a streaming media software suite, such as FFMPEG, to separate audio and video streams. Chop up the resulting information and send it to deep learning systems such as those used to implement the Action Description module 110, Scene Annotation module 120, Graphical Style Modification module 140 and Acoustic Effect Annotation module 150. The controller 101 may be programmed in a high-level object-oriented programming language to implement a process that accesses a video live-stream from the host system 102 and gets results back in time to run fluidly without disrupting operations, such as gameplay, that are handled by the host system. In some implementations, audio and video data may be transferred between the host system 102 and the controller 101 and/or the modules 110, 120, 130, 140, 150 in uncompressed form via suitable interface, such as a High-Definition Multimedia Interface (HDMI) where these separate components that are local to each other. Audio and video data may be transferred between the host system 102 and the controller 101 and/or the modules 110, 120, 130, 140, 150 in compressed form over a network such as the internet. In such implementations, these components may include well-known hardware and/or software codecs to handle encoding and decoding of audio and video data. In other implementations, the functions of the controller 101 and/or the modules 110, 120, 130, 140, 150 may all be implemented in hardware and/or software integrated into the host system 102.

To selectively activate a desired on-demand accessibility module the control module 101 may receive an activation input from an input device 108, such as, e.g., a dualshock controller. By way of example, and not by way of limitation, the activation input may be the result of a simple button press, latching button, touch activation, vocal command, motion commend or gesture command from the user transduced at the controller. Thus, the input device 108 may be any device suitable for the type of input. For example, for a button press or latching button, the input device may be a suitably configured button on a game controller that is coupled to the controller 101 through suitable hardware and/or software interfaces. In the case of touch screen activation, the input device may be a touch screen or touch pad coupled to the controller. For a vocal command, the input device 108 may be a microphone coupled to the controller. In such implementations, the controller 101 may include hardware and/or software that converts a microphone signal to a corresponding digital signal and interprets the resulting digital signal, e.g., through audio spectral analysis, voice recognition, or speech recognition or some combination of two or more of these. For a gesture or motion command command, the input device 108 may be an image capture unit (e.g., a digital video camera) coupled to the controller. In such implementations, the controller 101 or host system 102 may include hardware and/or software that interpret images from the image capture unit.

In some implementations, the controller 101 may include a video tagging module 107 that combines output data generated by the Action Description module 110 and/or the Scene Annotation module 120 with audio data produced by the host system 102. Although both the Action Description module and Scene annotation module may utilize video tagging, there are important differences in their input. Action description requires multiple sequential video frames as input in order to determine the temporal relationship between the frames to determine the action classification. Scene Annotation, by contrast, is more concerned with relatively static elements of an image and can use a single screen shot as input.

In some implementations, the controller 101 may provide analyze and filter video data before sending it to the Action Description module 110 and/or the Scene Annotation module 120 to suit the functions of the respective module. For example and without limitation, the controller 101 may analyze the image frame data to detect a scene change to determine when to provide an image to the Scene Annotation module 120. In addition, the controller may analyze image frame data to identify frame sequences of a given duration as either containing movement or not containing movement and selectively sending only the frame sequences containing sufficient movement to the Action Description module 110. The movement may be identified through known means for example encoder motion detection.

The Action Description module 110 and the Scene Annotation component module 120 may both generate information in the form of text information. One way to generate such text information is to use the game settings. For example, the game settings can be programmed to list the objects discovered. For each object in the list, the user can set a user interface key or button that controls it. Once generated, this text information may be converted into speech audio by the video tagging module 107. Alternatively, the information can be used to remap control keys in a way that is more accessible to the gamer. The controller 101 may synchronize the speech audio to other audio output generated by the host system, 102. In other implementations, the Action Description module 110 and the Scene Annotation module 120 may each generate speech information that can be directly combined with audio data from the host system 102. The video tagging module 107 may combine the speech output or audio with other audio output generated by the host system 102 for presentation to the user. Alternatively, the video tagging module may simply forward the speech output to the control module for subsequent combination with the other audio output from the host system 102.

The Acoustic Effect Annotation module 150 receives audio information from the control module 101 and generates corresponding text information. The Acoustic Effect Annotation module 150, controller 101 or host system 102 may include an audio tagging module 109 that combines the text information, e.g., as subtitles or captions with video frame information so that the text information appears on corresponding video images presented by the video output device 104.

The Graphical Style Modification module 140 receives image frame data from the control module 101 and outputs style adapted image frame information to the control module. The Graphical Style Modification module 140 may use machine learning to apply a style, e.g., a color palette, texture, background, etc. associated with one source of content to an input image frame or frames from another source of content to produce modified output frame data for presentation by the video output device 104. Additionally the Graphical Style Modification module 140 may include or implement elements of the Color Accommodation component module 130. The Color Accommodation system may apply a rule-based algorithm to input video frame data to produce a color-adapted output video frame that accommodates for certain user visual impairments, such as color blindness. The rule-based algorithm may replace certain input frame pixel chroma values corresponding to colors the user does not see or distinguish very well with other values that the user can see or distinguish.

The On-demand Accessibility system may be stand-alone device, integrated as an add-on device to the host system, or simulated in software by the host system. As a stand-alone or add-on device, the On-demand Accessibility system may include specialized circuitry configured to implement the required processes of each module. Alternatively the On-demand Accessibility system may be comprised of a processor and memory with specialized software embedded in a non-transitory computer readable medium that when executed causes the processor computer to carry out the required processes of each module. In other alternative implementations, the On-demand Accessibility system comprises a mixture of both general-purpose computers with specialized non-transitory computer readable instruction and specialized circuitry. Each module may be separate and independent or each module may simply be a process carried out by single general-purpose computer.

Alternatively, there may be a mixture independent modules and shared general-purpose computers. The Host system may be coupled to the control module 101 directly through a connector such as a High Definition Multi-media Interface (HDMI) cable, Universal Serial Bus (USB), Video Graphics Array (VGA) cable or D-subminiature (D-Sub) cable. In some implementations, the Host system is connected with the On-Demand Accessibility system over a network.

The Acoustic Effect Annotation, Action Description, Scene Annotation and Graphical Style Modification modules all utilize neural networks to generate their respective output data. Neural networks generally share many of the same training techniques as will be discussed below.

Neural Network Training

Generally, neural networks used in the component systems of the On-Demand Accessibility System may include one or more of several different types of neural networks and may have many different layers. By way of example and not by way of limitation the classification neural network may consist of one or multiple convolutional neural networks (CNN), recurrent neural networks (RNN) and/or dynamic neural networks (DNN).

FIG. 2A depicts the basic form of an RNN having a layer of nodes 220, each of which is characterized by an activation function S, one input weight U, a recurrent hidden node transition weight W, and an output transition weight V. The activation function S may be any non-linear function known in the art and is not limited to the (hyperbolic tangent (tan h) function. For example, the activation function S may be a Sigmoid or ReLu function. Unlike other types of neural networks, RNNs have one set of activation functions and weights for the entire layer. As shown in FIG. 2B the RNN may be considered as a series of nodes 220 having the same activation function moving through time T and T+1. Thus, the RNN maintains historical information by feeding the result from a previous time T to a current time T+1.

In some embodiments, a convolutional RNN may be used. Another type of RNN that may be used is a Long Short-Term Memory (LSTM) Neural Network which adds a memory block in a RNN node with input gate activation function, output gate activation function and forget gate activation function resulting in a gating memory that allows the network to retain some information for a longer period of time as described by Hochreiter & Schmidhuber "Long Short-term memory" Neural Computation 9(8):1735-1780 (1997), which is incorporated herein by reference.

FIG. 2C depicts an example layout of a convolution neural network such as a CRNN according to aspects of the present disclosure. In this depiction, the convolution neural network is generated for an image 232 with a size of 4 units in height and 4 units in width giving a total area of 16 units. The depicted convolutional neural network has a filter 233 size of 2 units in height and 2 units in width with a skip value of 1 and a channel 236 of size 9. For clarity in FIG. 2C only the connections 234 between the first column of channels and their filter windows is depicted. Aspects of the present disclosure, however, are not limited to such implementations. According to aspects of the present disclosure, the convolutional neural network that implements the classification 229 may have any number of additional neural network node layers 231 and may include such layer types as additional convolutional layers, fully connected layers, pooling layers, max pooling layers, local contrast normalization layers, etc. of any size.

Figure 2D:
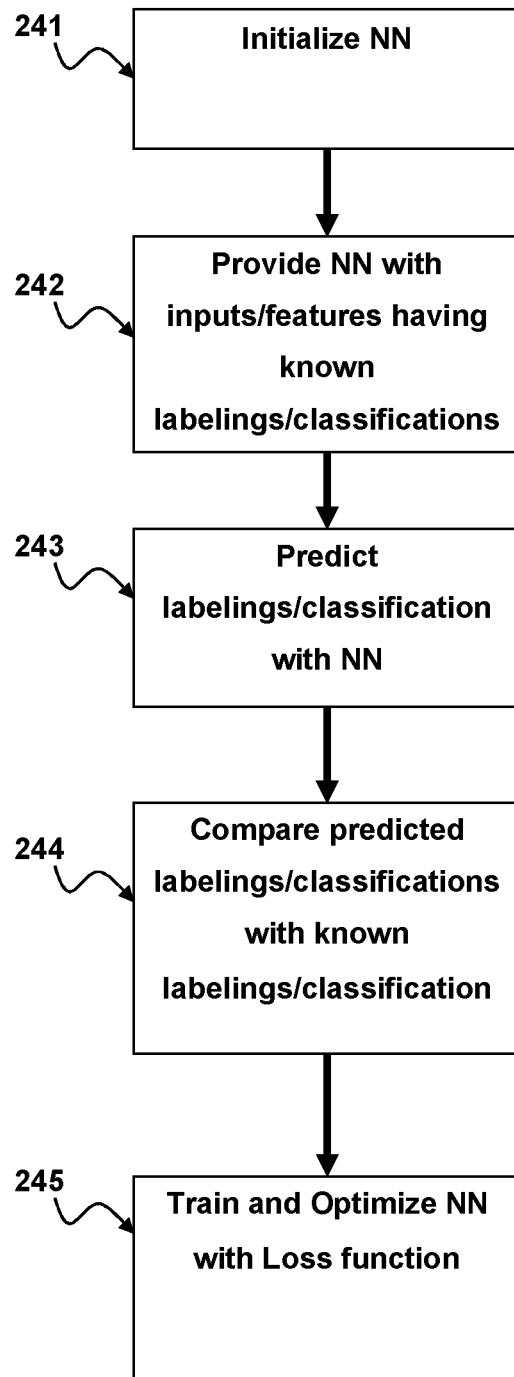
FIG. 2D is a block diagram of a method for training a neural network in an On-Demand Accessibility System according to aspects of the present disclosure.
Figure 3:
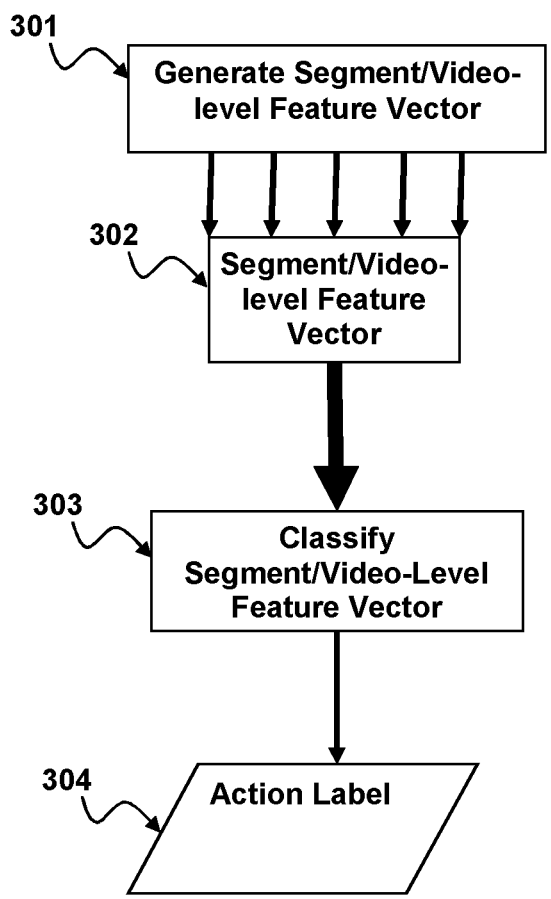
FIG. 3 is a block diagram showing the process of operation of the Action Description component system according to aspects of the present disclosure.

As seen in FIG. 2D Training a neural network (NN) begins with initialization of the weights of the NN 241. In general, the initial weights should be distributed randomly. For example, an NN with a tan h activation function should have random values distributed between $$-\frac{1}{\sqrt{n}} \text{ and } \frac{1}{\sqrt{n}}$$

where n is the number of inputs to the node.

After initialization the activation function and optimizer is defined. The NN is then provided with a feature vector or input dataset 242. Each of the different features vectors may be generated by the NN from inputs that have known labels. Similarly, the NN may be provided with feature vectors that correspond to inputs having known labeling or classification. The NN then predicts a label or classification for the feature or input 243. The predicted label or class is compared to the known label or class (also known as ground truth) and a loss function measures the total error between the predictions and ground truth over all the training samples 244. By way of example and not by way of limitation the loss function may be a cross entropy loss function, quadratic cost, triplet contrastive function, exponential cost, etc. Multiple different loss functions may be used depending on the purpose. By way of example and not by way of limitation, for training classifiers a cross entropy loss function may be used whereas for learning pre-trained embedding a triplet contrastive function may be employed. The NN is then optimized and trained, using the result of the loss function and using known methods of training for neural networks such as backpropagation with adaptive gradient descent etc. 245. In each training epoch, the optimizer tries to choose the model parameters (i.e., weights) that minimize the training loss function (i.e. total error). Data is partitioned into training, validation, and test samples.

During training, the Optimizer minimizes the loss function on the training samples. After each training epoch, the mode is evaluated on the validation sample by computing the validation loss and accuracy. If there is no significant change, training can be stopped and the resulting trained model may be used to predict the labels of the test data.

Thus, the neural network may be trained from inputs having known labels or classifications to identify and classify those inputs. Similarly, a NN may be trained using the described method to generate a feature vector from inputs having a known label or classification.

Auto Encoder Training

An auto-encoder is neural network trained using a method called unsupervised learning. In unsupervised learning an encoder NN is provided with a decoder NN counterpart and the encoder and decoder are trained together as single unit. The basic function of an auto-encoder is to take an input x which is an element of $R^d$ and map it to a representation h which is an element of $R^{d_1}$ this mapped representation may also be referred to as the feature vector. A deterministic function of the type $h=f_\theta=\sigma(W_\chi+b)$ with the parameters $\theta=\{W, b\}$ used to create the feature vector. A decoder NN is then employed to reconstruct the input from the representative feature vector by a reverse of f: $y=f_{\theta'}(h)=\sigma(W'h+b')$ with $\theta'=\{W', b'\}$ the two parameters sets may be constrained to the form of $W'=W^T$ using the same weights for encoding the input and decoding the representation. Each training input $\chi_i$ is mapped to its feature vector $h_i$ and its reconstruction $y_i$. These parameters are trained by minimizing an appropriate cost function over a training set such as a cross-entropy cost function. A convolutional auto encoder works similar to a basic auto-encoder except that the weights are shared across all of the locations of the inputs. Thus for a monochannel input (such as a black and white image) x, the representation of the k-th feature map is given by $h^k=\sigma(x*W^k b^k)$ where the bias is broadcasted to the whole map. Variables σ representation an activation function, b represents a single bias which is used per latent map W represents a weight shared across the map, and * is a 2D convolution operator. The formula to reconstruct the input is given by:

$$y = \sigma\left(\sum_{k \in H} h^k * \hat{W}^k + C\right)$$

In the above formula, there is one bias C per input channel, H identifies the group of feature maps and $\hat{W}$ identifies the flip operation over both dimensions and weights. Further information about training and weighting of a convolutional auto encoder can be found in Masci et al. "Stacked Convolutional Auto-Encoders for Hierarchical Feature Extraction" In *IJCANN*, pages 52-59. 2011.

Action Description

The Action description module 110 takes a short sequence of image frames from a video stream as input and generates a text description of the activity occurring within the video stream. To implement this, three convolutional Neural Networks are used. A first Action Description NN 301 takes a short sequence of video frames, referred to herein as a window, and generates segment-level or video-level feature vectors, e.g., one feature vector for each video frame in the window.

By way of example, and not by way of limitation, the window may last about 1 second or roughly 18 frames and 18 frames per second (fps). A second Action Description NN 302 takes frame level feature vectors and generates a video segment window level feature data. The second Action Description NN 302 may be trained using supervised learning. In alternative implementations, semi-supervised or unsupervised training methods may be used where they can produce sufficient accuracy.

The third Action Description NN 303 receives video stream window level feature vectors as input and classifies them according to the action occurring in the scene. For labeled video stream window level feature data, the labels are masked and the third Action Description NN predicts the labels. Frames are extracted from the video sequence according to the frame rate of the video received by the system. Therefore, window level features data may range from 1 feature to 60 or 120 or more features depending on the framerate sent by the host system. The classification of the action generated by the third Action Description NN 303 may be provided to the control module 101, e.g., in the form of text describing the action occurring in the window. Alternatively, the Classification data may be provided to a text to speech synthesis module 304 to produce speech data that can be combined with other audio occurring during the window, or shortly thereafter.

The Action description module may be trained by known methods as discussed above. During training, there are no frame level video labels therefore video level labels are considered frame level labels if each frame refers to the same action. These labeled frames can be used as frame level training input for the second NN or a CNN may be trained to generate frame-level embeddings using the video-level labels. In some implementations, the First NN may generate frame embeddings using unsupervised methods see the section on Auto encoder training above. The sequence of frame level embeddings along with the video level label is used to train the second NN. The second NN may be a CNN configured to combine the frame-level embeddings into a video level embedding. The video level embedding and action labels are then used to train the third NN. The third NN may be RNN that predicts an action class from video level embeddings.

The Action Description module 110 may include or utilize a buffer of sufficient size to hold video data corresponding to a window duration that is less than or equal to a time for the neural networks 301, 302, 303 to classify the action occurring within the window.

There are a number of different ways that the action description module may enhance a user experience. For example, in electronic sports (e-Sports), the Action description module 110 may generate live commentary on the action in a simulated sporting event shown in the video stream from the host system 101.

Scene Annotation

Figure 4:
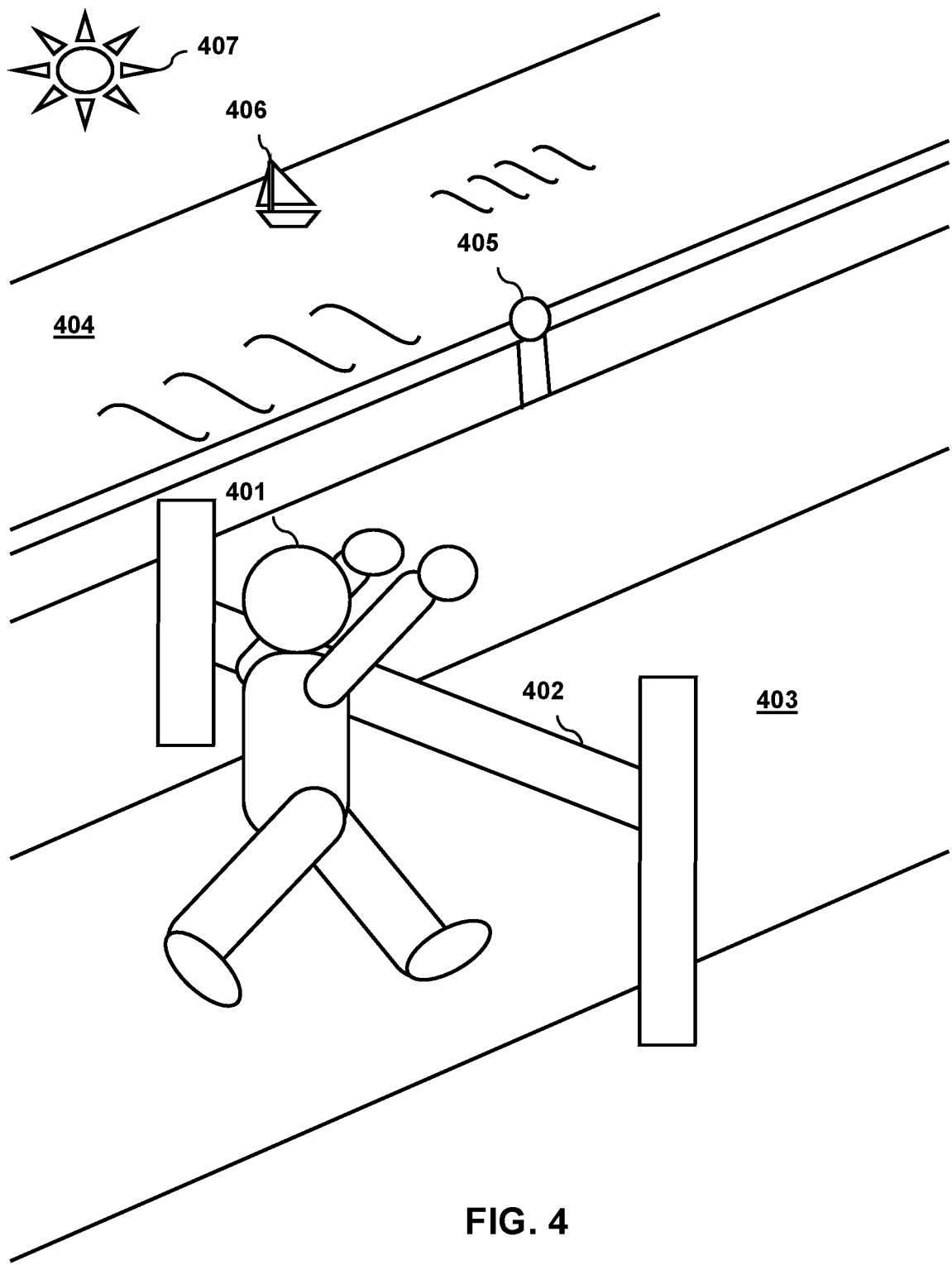
FIG. 4 is a diagram that depicts an image frame with tagged scene elements according to aspects of the present disclosure.

The Scene Annotation component module 120 uses an image frame from a video stream presented to a user to generate a text description of scene elements within the image frame. The output of Scene Annotation module 120 may be a natural language description of a scene, e.g., in the form of text, which may then be converted to speech by a text-to-speech module, which may be implemented, e.g., by the video tagging module 107. In contrast to the action description module, the Scene Annotation component system only requires a single image frame to determine the scene elements. Here, the scene elements refer to the individual components of an image that provide contextual information separate from the action taking place within the image. By way of example and not by way of limitation the scene elements may provide a background for the action as shown in FIG. 4 the action is the runner 401 crossing the finish line 402. The scene elements as shown would then be road 403, the sea 404, the sea wall 405, the sailboat 406 and the time of day 407. The Scene Annotation module 120 may generate text describing these scene elements and combine the text with image data to form a caption for the scene. For example and without limitation for the scene shown in FIG. 4, the Scene Annotation module 120 may produce a caption like "It is a sunny day by the sea, a sail boat floats in the distance. A road is in front of a wall." Several neural networks may be used to generate the text.

Figure 5:
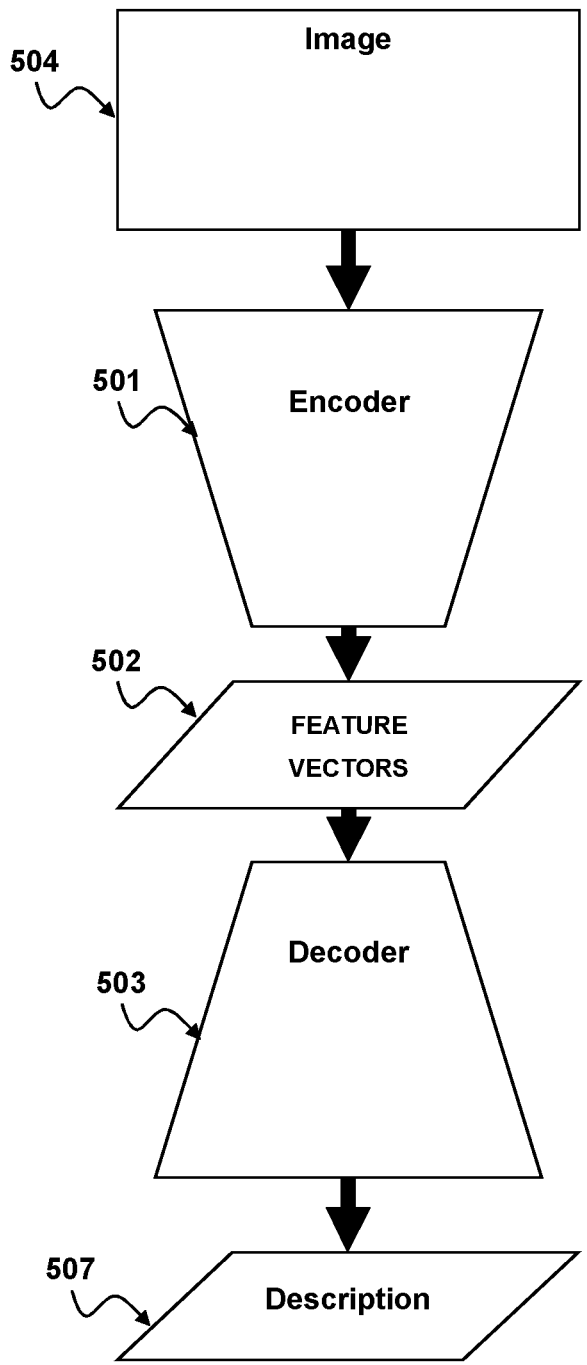
FIG. 5 is a block diagram of the training method for the Scene Annotation component system encoder-decoder according to aspects of the present disclosure.
Figure 6:
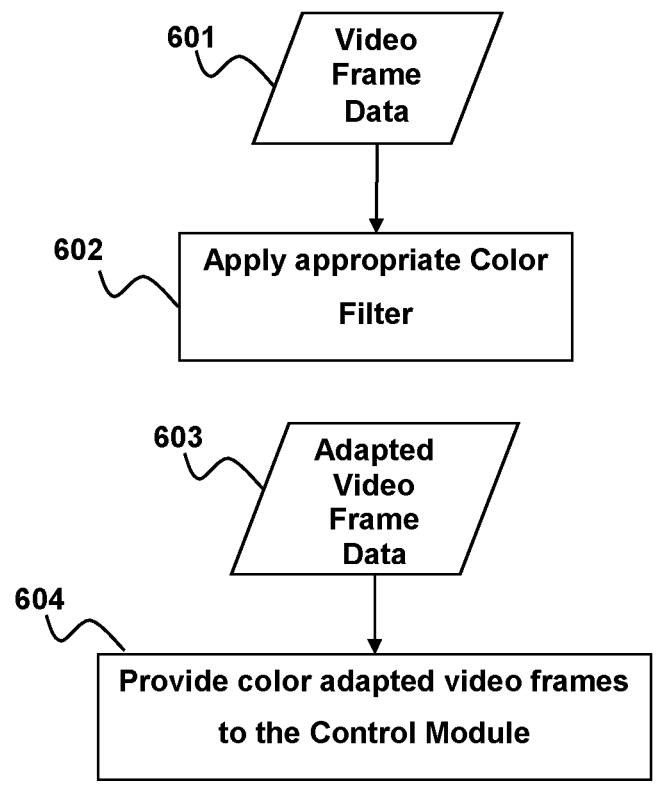
FIG. 6 is a block diagram showing the process of operation for the Color Accommodation component system according to aspects of the present disclosure.
Figure 7:
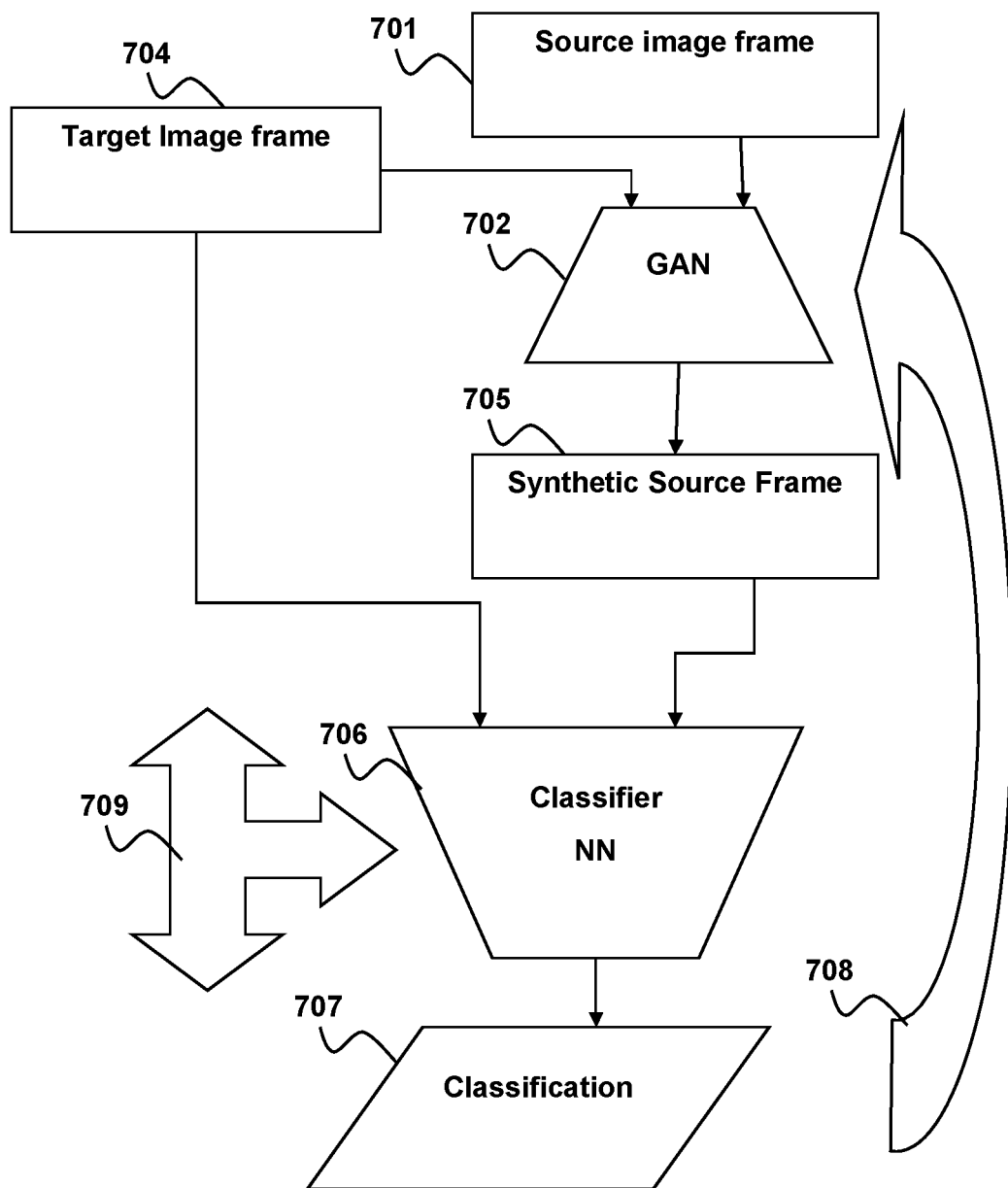
FIG. 7 is a block diagram depicting the training of the Graphical Style Modification component system according to aspects of the present disclosure.
Figure 8:
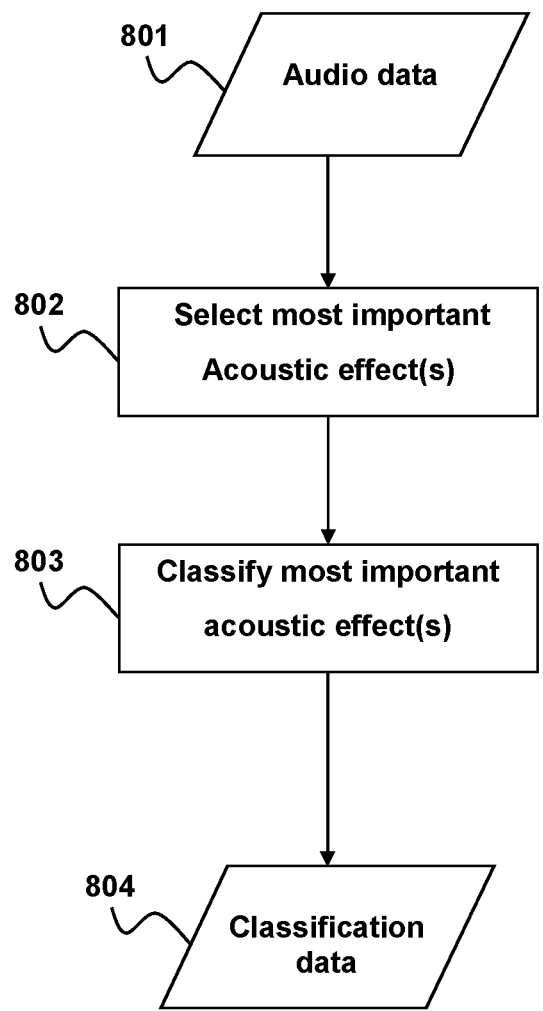
FIG. 8 is a block diagram showing the process of operation of the Acoustic Effect Annotation component system according to aspects of the present disclosure.

The neural networks may be arranged as an encoder pair as shown in FIG. 5. The first NN, referred to herein as the encoder 501, is a deep convolutional network (CNN) type that outputs a feature vector 502 for example and without limitation a resnet type NN. The First NN is configured to output feature vectors representing a class for the image frame. The second NN, referred to herein as the decoder 503, is a deep network, e.g., a RNN or LSTM that outputs captions word by word representing the elements of the scene. The input to the encoder is image frames 504. The encoder 501 generates feature vectors 502 for the image frame and the decoder takes those feature vectors 502 and predicts captions 507 for the image.

During training the encoder and decoder may be trained separately. In alternative implementations, the encoder and decoder may be trained jointly. The encoder 501 is trained to classify objects within the image frame. The inputs to the encoder during training are labeled image frames. The labels are hidden from the encoder and checked with the encoder output during training. The decoder 503 takes feature vectors and outputs captions for the image frames. The input to the decoder are image feature vectors having captions that are hidden from the decoder and checked during training. In alternative implementations, a encoder-decoder architecture may be trained jointly to translate an image to text. By way of example, and not by way of limitation, the encoder, e.g., a deep CNN, may generate an image embedding from an image. The decoder, e.g., an RNN variant, may then take this image embedding and generate corresponding text. The NN algorithms discussed above are used for adjustment of weights and optimization.

Although the Scene Annotation module 120 only requires a single image frame as input, the Scene Annotation module may include or utilize a buffer of sufficient size to hold video data corresponding to a window duration that is less than or equal to a time for the neural networks 501, 502, to generate predicted captions 507. As part of the on demand, accessibility system the Scene Annotation module may generate a caption for each frame within the window. In some implementation, the Scene Annotation module may detect a scene change, for example and without limitation, a change scene complexity or scene complexity exceeds a threshold before generating a new a caption.

Color Accommodation

Color Accommodation module 130 receives video frame data as input as indicated at 601 and applies filters to the video frame as indicated at 602. The filters change the values of certain colors in the video frame. The filters are chosen to enhance the differences between colors in the video frame and may be configured to enhance the visibility of objects within the video frame for users with color vision impairment. Application of the filters may be rule-based. Specifically, the filters may be chosen to improve color differentiation in video frames for people with problems distinguishing certain colors. Additionally the filters may also enhance the videos for users with more general visual impairment. For example, dark videos may be brightened.

The filters are applied to each video frame in a video stream on a real time basis in 1-second intervals. The filters may be user selected based on preference or preset based on known vision difficulties. The filters apply a transform to the different hues of the video and may apply real time gamma correction for each video frame in the stream. The color adapted video data 603 for the frames may then be provided to the control module 101, as indicated at 604. The control module may then send the adapted video frame data 603 to the host system 102 for rendering and display on the video output device 104.

Graphical Style Modification

The Graphical Style Modification module 140 takes the style from a set of image frames and applies that style to a second set of image frames. Style adaptation may affect the color palette, texture and background. In some implementations, a NN, e.g., a GAN, may be trained to transform the appearance of an anime style video game (e.g., Fortnite) to a photorealistic style (e.g., Grand Theft Auto). For example, a video game like Fortnight has vibrant green and red colors for the environment and characters while a game like Bloodborne has washed out and dark brown colors for the environment and characters. The Graphical Style Modification component may take the vibrant green and red color style pallet and apply it Bloodborne. Thus, the drab brown environment of the original Bloodborne is replaced with bright greens and reds while the actual environment geometry remains constant.

The Graphical Style Modification component may be implemented using a generative adversarial neural network layout. A generative adversarial NN (GAN) layout takes data for input images z and applies a mapping function to them $G(z, \theta_g)$ to approximate a source image set (x) characteristic of the style that is to be applied to the input images, where $\theta_g$ are the NN parameters. The output of the GAN is style adapted input image data with colors mapped to the source image set style.

Generative Adversarial NN Training

Training a generative adversarial NN (GAN) layout requires two NN. The two NN are set in opposition to one another with the first NN 702 generating a synthetic source image frame 705 from a source image frame 701 and a target image frame 705 and the second NN classifying the images 706 as either as a target image frame 704 or not. The First NN 702 is trained 708 based on the classification made by the second NN 706. The second NN 706 is trained 709 based on whether the classification correctly identified the target image frame 704. The first NN 702 hereinafter referred to as the Generative NN or $G_{NN}$ takes input images (z) and maps them to representation $G(z; \theta_g)$.

The Second NN 706 hereinafter referred to as the Discriminative NN or $D_{NN}$. The $D_{NN}$ takes the unlabeled mapped synthetic source image frame 706 and the unlabeled target image (x) set 704 and attempts to classify the images as belonging to the target image set. The output of the $D_{NN}$ is a single scalar representing the probability that the image is from the target image set 704. The $D_{NN}$ has a data space $D(x; \theta_d)$ where $\theta_d$ represents the NN parameters.

The pair of NNs used during training of the generative adversarial NN may be multilayer perceptrons, which are similar to the convolutional network described above but each layer is fully connected. The generative adversarial NN is not limited to multilayer perceptron's and may be organized as a CNN, RNN, or DNN. Additionally the adversarial generative NN may have any number of pooling or softmax layers.

During training, the goal of the $G_{NN}$ 702 is to minimize the inverse result of the $D_{NN}$. In other words, the $G_{NN}$ is trained to minimize $\log(1-D(G(z))$. Early in training problems may arise where the $D_{NN}$ rejects the mapped input images with high confidence levels because they are very different from the target image set. As a result the equation $\log(1-D(G(z))$ saturates quickly and learning slows. To overcome this initially G may be trained by maximizing $\log D(G(z))$ which provides much stronger gradients early in learning and has the same fixed point of dynamics. Additionally the GAN may be modified to include a cyclic consistency loss function to further improve mapping results as discussed in Zhu et al. "Unpaired Image to Image Translation using Cycle-Consistent Adversarial Networks" ArXiv, ArXiv:1703.10593v5 [cs.CV] available at: https://arxiv.org/pdf/1703.10593.pdf (30 Aug. 2018), which is incorporated herein by reference.

The objective in training the $D_{NN}$ 706 is to maximize the probability of assigning the correct label to the training data set. The training data set includes both the mapped source images and the target images. The $D_{NN}$ provides a scalar value representing the probability that each image in the training data set belongs to the target image set. As such during training, the goal is to maximize log G(x).

Together the First and Second NN form a two-player minimax game with the first NN 702 attempting generating images to fool the second NN 706. The Equation for the game is: $\min_G \max_D V(D,G) = E_{x \sim p_{data}}(x) [\log D(x)] + E_{z \sim p_z}(z) [\log 1 - \log D(G(z))$ The $G_{NN}$ and $D_{NN}$ are trained in stepwise fashion with optimizing the $D_{NN}$ and then optimizing the $G_{NN}$. This process is repeated numerous times until no further improvement is seen in the discriminator. This occurs when the probability that the training image is a mapped input image, $p_z$, is equal to the probability that the training image is a source image, $p_{data}$. In other words when $p_z=p_{data}$ alternatively $D(x)=\frac{1}{2}$. Similar to what was discussed above for neural networks in general, the $G_{NN}$ and $D_{NN}$ may be trained using minibatch Stochastic Gradient Descent or any other known method for training compatible neural networks. For more information on training and organization of Adversarial Generative Neural Networks see Goodfellow et al. "Generative Adversarial Nets" arXiv:1406.2661 available at: https://arxiv.org/abs/1406.2661.

The Style Modification module 140 uses the trained $G_{NN}$ 706 to apply the color style of the target image 704 to a source image. The resulting style adapted source image is provided to the controller module 101. As with other components in this system, the Graphical Style Modification component system may operate on a video stream for intervals less than or equal to a time for its neural network. By way of example and not by way of limitation if the Style Accommodation module's neural network can generate a prediction in one second the Graphical Style Modification module 140 may have a buffer sufficient to retain 1-second worth of images frames in a video stream. Each frame within the 1-second window may have a target style applied to it.

Textual Annotation of Acoustic Effects

In many types of audio-visual media, including video games there are often multiple sounds occurring at once within a scene. These multiple sounds include some sounds that are more important than others. For example, a scene may include background noises such as wind sounds and traffic sounds as well as foreground noises such as gunshots, tire screeches and foot sounds. Each of the background and foreground sounds may be at different sound levels. Currently most audiovisual content does not contain any information relating to the importance of these sounds and simply labeling the loudest sound would not capture the actual importance. For example in a video game, environmental sounds like wind and rain may play at high levels while footsteps may play at lower levels but to the user the footsteps represent a more important and prominent sound because it may signal that an enemy may be approaching.

The Acoustic Effect Annotation component module 150 takes input audio 801 and classifies the most important acoustic effect or effectacoustic effects happening within the input audio. By way of example, and not by way of limitation, the Acoustic Effect Annotation component module 150 may classify the top three most important acoustic effects happening within the input audio. The Acoustic Effect Annotation module 150 may use two separate trained NNs. A first NN predicts which of the sounds occurring in the audio is most is most important, as indicated at 802. To predict the most important sound the second NN is trained using unsupervised transfer learning The 3 chosen sounds are then provided to the second NN. The second NN is a convolutional NN trained to classify the most important sounds or sounds occurring within the audio, as indicated at 803. The resulting classification data 804 for the three most important audio events may then be provided to the control module 101. Alternatively, the classification data 804 may be applied to corresponding image frames as for example subtitles or captions and those modified image frames may be provided to the controller module 101. The Acoustic Effect Annotation module 150 may include a buffer of sufficient size to hold audio data for an audio segment of a duration that is less than or equal to a time for the first and second neural networks to classify the primary acoustic effects occurring within the audio segment While the above is a complete description of the preferred embodiment of the present invention, it is possible to use various alternatives, modifications and equivalents. It is to be understood that the above description is intended to be illustrative, and not restrictive. For example, while the flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should therefore be determined with reference to the appended claims, along with the full scope of equivalents to which such claims are entitled. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A system for enhancing Audio Visual content, the system comprising:
   a processor;
   a memory coupled to the processor;
   non-transitory instructions embedded in memory for a method of Graphical Style Modification comprising
     receiving a source image frame from a host system;
     applying a style adapted from a target image frame to the source image frame to generate a style adapted source image frame, wherein the source image frame is part of a buffered video stream; and
     generating a style adapted video stream wherein generating the style adapted video steam includes applying the style adapted from the target image frame to each image frame in the buffered video stream for a duration of the buffered video stream that is less than or equal to the time it takes for a Graphical Style Modification neural network to apply the style adapted from the target image frame to the source image frame.

2. The system of claim 1 wherein the method for Graphical Style Modification further comprises providing the style adapted source image frame to the host system for display on a display screen.

3. The system of claim 1 wherein the method for Graphical Style Modification module further comprises applying the style adapted from the target image frame only to a portion of the source image frame that is less than the entirety of the source image frame.

4. The system of claim 1 further comprising an accessibility controller coupled to the processor, wherein the accessibility controller is configured to synchronize the output of the processor with one or more other neural network modules and wherein the method for Graphical Style Modification further comprises training a generative-neural network to apply the color style of the target frame to the source frame.

5. The system of claim 4 wherein the one or more other neural network modules includes an action description module configured to describe action occurring within a video that includes the source image frame.

6. The system of claim 1 where in the source and target image frames are video game images.

7. A method for enhancing Audio Visual content, comprising:
   receiving a source image frame from a host system;
   applying a style adapted from a target image frame to the source image frame to generate a style adapted source image frame with a Graphical Style Modification module wherein the source image frame is part of a buffered video stream; and generating a style adapted video stream wherein generating the style adapted video steam includes applying the style adapted from the target image frame to each image frame in the buffered video stream for a duration of the buffered video stream that is less than or equal to the time it takes for a Graphical Style Modification neural network to apply the style adapted from the target image frame to the source image frame.

8. The method of claim 7 further comprising providing the style adapted source image frame to the host system for display on a display screen with the Graphical Style Modification module.

9. The method of claim 7 wherein applying the style adapted from the target image frame includes applying the style adapted from the target image frame only to a portion of the source image frame that is less than the entirety of the source image frame.

10. The method of claim 7 further comprising synchronizing with an accessibility controller, the output of the Graphical Style Modification module with one or more other neural network modules and wherein the Graphical Style Modification module comprises a generative neural network that is trained to apply the color style of the target image frame to the source image frame.

11. The method of claim 10 wherein the one or more other neural network modules includes an action description module configured to describe action occurring within a video that includes the source image frame.

12. The method of claim 7 wherein the source and target image frames are video game images.

13. A non-transitory computer-readable medium having computer readable instructions embodied therein, the instructions being configured upon execution to implement a method for enhancing Audio Visual content, the method, comprising:
   receiving a source image frame from a host system;
   applying a style adapted from a target image frame to the source image frame to generate a style adapted source image frame with a Graphical Style Modification module wherein the source image frame is part of a buffered video stream; and
   generating a style adapted video stream wherein generating the style adapted video steam includes applying the style adapted from the target image frame to each image frame in the buffered video stream for a duration of the buffered video stream that is less than or equal to the time it takes for a Graphical Style Modification neural network to apply the style adapted from the target image frame to the source image frame.

* * * * *